US012088702B2

(12) United States Patent
Lanc et al.

(10) Patent No.: US 12,088,702 B2
(45) Date of Patent: Sep. 10, 2024

(54) SYSTEMS AND METHODS FOR ADAPTIVE RECURSIVE DESCENT DATA REDUNDANCY

(71) Applicant: CYBORN LIMITED, Edinburgh (GB)

(72) Inventors: David Lanc, Edinburgh (GB); Sophie Lanc, Edinburgh (GB); Josh Fraser, Edinburgh (GB); Lachlan Mackinnon, Edinburgh (GB); Jamie Hunter, Edinburgh (GB); Iain Sutherland, Edinburgh (GB)

(73) Assignee: CYBORN LIMITED, Edinburgh (GB)

( * ) Notice: Subject to any disclaimer, the term of this patent is extended or adjusted under 35 U.S.C. 154(b) by 276 days.

(21) Appl. No.: 16/845,895

(22) Filed: Apr. 10, 2020

(65) Prior Publication Data

US 2021/0320791 A1    Oct. 14, 2021

(51) Int. Cl.
*H04L 9/08* (2006.01)
*G06F 21/62* (2013.01)
(Continued)

(52) U.S. Cl.
CPC ........ *H04L 9/0852* (2013.01); *G06F 21/6218* (2013.01); *G06N 10/00* (2019.01);
(Continued)

(58) Field of Classification Search
CPC ... H04L 9/0852; H04L 9/0858; H04L 9/0855; H04L 63/061; H04L 9/083; H04L 9/0822;
(Continued)

(56) References Cited

U.S. PATENT DOCUMENTS 5,764,765 A * 6/1998 Phoenix ................ H04L 9/0858
                                                380/256
6,748,083 B2 * 6/2004 Hughes ................. H04L 9/0858
                                                380/278
(Continued)

FOREIGN PATENT DOCUMENTS

WO      2019032556 A1    2/2019

OTHER PUBLICATIONS

Villari, et al., "Evaluating a File Fragmentation System for Multi-Provider Cloud Storage", Scalable Computing: Practice and Experience, vol. 14, No. 4, pp. 265-277 (Jan. 20, 2014) XP055469221.

*Primary Examiner* — Sharif E Ullah
(74) *Attorney, Agent, or Firm* — Saul Ewing LLP

(57) ABSTRACT

Systems and methods for adaptive recursive descent data redundancy are described herein. In one embodiment, a method can include identifying the data object or file for Quantum Fragmentation, determining, via a first portion of a Quantum Fragmentation instance, a factor of fragmentation for the data object or file, transforming the data object or file into a plurality of first data fragments according to the factor of fragmentation by applying one or more cryptographic processing, integrity checking, and resilient fragmentation schemes, via the first portion of the Quantum Fragmentation instance, and persisting, via the first portion of the Quantum Fragmentation instance, each of the plurality of first data fragments to a data store of a plurality of available Cloud or other data stores or to a subsequent portion of the Quantum Fragmentation instance, wherein the persistence for each of the first data fragment occurs independently from the other first data fragments.

11 Claims, 7 Drawing Sheets

(51) Int. Cl.
*G06N 10/00* (2022.01)
*H03M 7/30* (2006.01)

(52) U.S. Cl.
CPC ............ *H03M 7/30* (2013.01); *H04L 9/0819* (2013.01); *H04L 9/085* (2013.01); *H04L 2209/30* (2013.01)

(58) Field of Classification Search
CPC ....... H04L 9/3226; H04L 9/0891; H04L 9/14; H04L 9/0827; H04L 2209/24; H04L 9/08; H04L 9/0819; H04L 9/088; H04W 12/041; H04W 12/0431; H04W 12/0433; H04W 12/04; H04W 12/61; H04W 12/63; H04W 12/71; G06F 21/31; G06F 21/44; G06F 7/588; G06F 21/72; G06F 21/86; G06F 21/6218
USPC ............ 380/278, 255, 264, 276; 726/21, 36; 713/150, 163, 181
See application file for complete search history.

(56) References Cited

U.S. PATENT DOCUMENTS

| | | | | |
|---|---|---|---|---|
| 7,437,081 B2* | 10/2008 | Mitchell | ................ | H04B 10/70 398/154 |
| 8,855,316 B2* | 10/2014 | Wiseman | .............. | H04L 9/0855 380/278 |
| 9,960,465 B2* | 5/2018 | Dudley | ............... | H01M 50/204 |
| 10,057,058 B2* | 8/2018 | Murakami | ............ | H04L 9/0858 |
| 2005/0138352 A1* | 6/2005 | Gauvreau | ............. | H04L 9/3247 713/153 |
| 2007/0065154 A1* | 3/2007 | Luo | ..................... | H04J 14/0282 398/141 |
| 2007/0076884 A1* | 4/2007 | Wellbrock | ............ | H04L 9/0855 380/263 |
| 2007/0195774 A1* | 8/2007 | Sherman | ................. | H04L 69/16 370/392 |
| 2011/0206204 A1* | 8/2011 | Sychev | ............... | H04J 14/0273 380/256 |
| 2011/0213979 A1* | 9/2011 | Wiseman | ............. | H04L 9/0844 713/171 |
| 2014/0010234 A1* | 1/2014 | Patel | ...................... | H04L 45/74 370/392 |
| 2014/0068765 A1* | 3/2014 | Choi | ................... | H04L 63/1416 726/23 |
| 2014/0133652 A1* | 5/2014 | Oshida | ................. | H04L 9/0897 380/255 |
| 2015/0236852 A1* | 8/2015 | Tanizawa | .............. | H04L 9/0858 380/278 |
| 2016/0127127 A1* | 5/2016 | Zhao | ................... | H04W 12/041 713/171 |
| 2016/0241396 A1* | 8/2016 | Fu | ......................... | H04L 9/0836 |
| 2016/0285629 A1* | 9/2016 | Tanizawa | .............. | H04L 9/0852 |
| 2016/0359626 A1* | 12/2016 | Fu | ......................... | H04L 9/0858 |
| 2016/0366094 A1* | 12/2016 | Mason | ................ | H04L 61/5038 |
| 2017/0163418 A1* | 6/2017 | Lanc | ..................... | H04L 9/0894 |
| 2017/0214525 A1* | 7/2017 | Zhao | ................... | H04W 12/0431 |
| 2017/0230173 A1* | 8/2017 | Choi | ..................... | H04L 9/0861 |
| 2018/0176091 A1* | 6/2018 | Yoon | ................... | H04L 43/0888 |
| 2019/0036821 A1* | 1/2019 | Levy | ..................... | G06F 12/0868 |
| 2019/0349392 A1* | 11/2019 | Wetterwald | ......... | H04L 43/0852 |
| 2020/0084222 A1* | 3/2020 | William | ................. | H04L 63/12 |

* cited by examiner

SYSTEMS AND METHODS FOR ADAPTIVE RECURSIVE DESCENT DATA REDUNDANCY

BACKGROUND OF THE INVENTION

Conventional class data security is ineffective at preventing hackers from stealing data or attempting to decrypt encrypted data. Conventional class data security techniques, such as NIST Advanced Encryption Standard 256 (AES256), are heavily dependent upon encryption keys to protect data. However, encryption keys also provide points of weakness. If stolen, an encryption key applied to the corresponding encrypted data can easily decipher the encrypted data into plaintext.

Additionally, data privacy depends not only upon security of the data, but also on authenticated and authorized access to the data by legitimate users. For example, should a hacker steal data, the data is worthless to the hacker if its owner cannot be identified and if the data cannot be deciphered.

Data privacy methods in the art latterly considered the need for redundancy through creating a level of redundancy for any electronic data which may otherwise be lost if, for example, the data encryption key is compromised, lost or its owner is unavailable, or the sole copy of the encrypted data is lost.

The field of asymmetric threshold cryptosystems such as Rivest-Shamir-Adleman (RSA) developed to provide encrypted and distributed data, enhancing its privacy and security. From this field, threshold secret sharing schemes developed to provide additional redundancy in the form of "shares" of data that ensured that as long as a minimum number M shares were available from a total number representing the electronic data T, then the data subject to the secret sharing scheme would remain obfuscated and secure unless at least M shares, representing data objects and/or user keys or authentication methods combined.

These methods combined data privacy with in-built data redundancy. Best known in the art are via methods such as Shamir's Perfect Secret Sharing developed in 1979, Rabin's Information dispersal Algorithm of 1989, and the like. These and associated schemes typically fragment or shard and distribute data into smaller components to obfuscate the original data, providing data resilience on a "M from T" basis, where M is the minimum number of fragments or shards necessary to recreate the original data from T created. The extension of these methods applied to maintain levels of redundancy across different hardware storage are increasingly being applied to Cloud storage as the regulatory focus on data privacy increases.

Data resilience and redundancy techniques have typically depended upon hardware or software methods to copy or duplicate large volumes of data. This has the impact of providing resilience against data loss but results in multiple copies of data being exposed to hackers. It also results in recovery latency, and a high carbon and financial cost of recovery for individual data objects stored in backups.

More recently, the evolution of the Cloud and a huge increase in data stored in Cloud object stores has resulted in an escalation of data theft and compromise from Cloud object stores. Hackers now bypass traditional access management systems that restricted privacy, because data is held by third parties. Copies of data increase as multiple parties copy data to avoid potential loss, increasing the attack vector of data.

The emergence of tougher data privacy laws has followed increased regulatory concerns over privacy of citizen data. Notable examples include the 2018 General Data Protection Regulation (GDPR) in Europe, the 1996 Health Insurance Portability and Accountability Act (HIPAA) and 2009 Health Information Technology for Economic and Clinical Health Act (HITECH) in the US, and the California Consumer Privacy Act (CCPA) in 2020. Consequently, data compromises involving identifiable personal citizen data are notifiable events to Information Commission Regulators under legislation, and may result in hefty fines and censure for organisations accountable for the privacy of that data. Theft of encrypted data is included under such data privacy regulations.

Moreover, escalating state sponsored data hacks and exfiltration of government data has increased as a result of the inability of existing data privacy, security and resilience technologies to arrest the exposure of increasingly exposed Cloud data that is no longer under the control of its owner. Social, commercial, security, and defence environments are impacted by the same threats to data accessible from the Web or stored in the Cloud by hackers with differing levels of expertise.

Lastly, the increased awareness of the negative environmental impact of Cloud expansion, in computing and storage resources, has raised significant concerns as to how to reduce the carbon impacts, lower financial costs and drive greater online inclusion.

The evolution of Cloud computing into Edge/IoT computing enabled by faster networking such as 5G will accelerate the negative impacts and exposures resulting from privacy, security, and resilience technologies that are outmoded for inclusive, secure, private and resilient multi-Cloud expansion. Increased mobility and accessibility of data amongst legitimate actors is key to everyday social enterprise, personal privacy and national security and defence.

A new way of engineering data privacy, security, and resilience is required that builds on and combines these technologies into a cohesive data defence platform for Cloud systems. It not only requires privacy, security, and recoverability at the data object level assured across multiple third-party data sets and multi-Cloud storage, but needs to be more agile in moving data, more unpredictable in its technology operation, and less carbon and financially costly in Cloud computing and storage. It requires above all to minimize the attack vector of any data stored and utilise resources only as needed, especially for high security and defence data applications, effectively hiding ultra-secure data in accordance with mutually-exclusive end user and system manager in-flight policy sets related to levels of privacy, security and recovery.

SUMMARY

The system, apparatus, and technical effects described herein combines one or more methods of data security, data privacy, and data resilience technologies. This combination provides a dynamic user-selectable and changeable method of storing a plurality of individual data objects as fragments or shards across a plurality of different Cloud vendors and other data stores in accordance with policies configurable at any time by individual organization or user-defined risk appetite. The resultant fragments or shards are stored across a plurality of Cloud or other data stores, persisting secure, context-less, anonymized, de-identified and pseudonymized fragments or shards stored across the plurality of Cloud or other data stores. A minimum of M from T fragments or shards are necessary for resilience to recover original data objects against failure across multiple Cloud or other stores.

Optionally, the systems and methods described herein can determine, by individual user or system derived decisions, to persist one or more fragments or shards to one or more instances of the same systems and methods at the same Cloud vendor or other location, or of the same systems and methods at another Cloud vendor or other location.

In such a case, further fragmentation or sharding can take place in accordance with one of more mutually exclusive policies for fragmenting or sharding data objects received into one or more further T-persisted, secure, context-less, anonymised, de-identified, and pseudonymized fragments or shards stored across a further plurality of different Cloud or other data stores. This can provide a minimum M from T fragment or shard resilience to recover against failure across multiple Cloud or other stores. The technical effect of this "adaptive recursion" to the systems and methods described herein is to create completely secure, private and recoverable data persisted across a plurality of Cloud vendor and other data stores that remains private, secure, and resilient beyond the capabilities of the most sophisticated hackers.

A further technical effect of the systems and methods described herein is the minimization of storage required for persisted data, providing both a minimized attack vector against compromise by hackers or third-party eavesdroppers, and a positive carbon effect compared with current art data resilience, backup, and duplication technologies. A further technical effect is that data recovery is faster and uses less resources because all data is persisted at the individual data object level, rendering faster recovery than persistence because only M from T fragments or shards are required at each stage or the adaptive recursion process.

The advanced levels of adaptive security, privacy, and multi-Cloud or data store resilience at the data object level provided by the systems and methods described herein result in data fragments or shards that are persisted into public, private, or hybrid Cloud stores with minimal exposure to compromise, effectively reducing the financial and carbon cost of data security, privacy, and resilience by hiding fragments or shards "in plain sight." The lower carbon and financial costs of the systems and methods described herein render them capable of wider adoption and inclusion, enabling a plurality of independent policies defined in-flight and dynamically by its users and system management to facilitate ultra-secure, private, and resilient data object storage and movement in the Cloud.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DEFINITIONS

Figure 1:
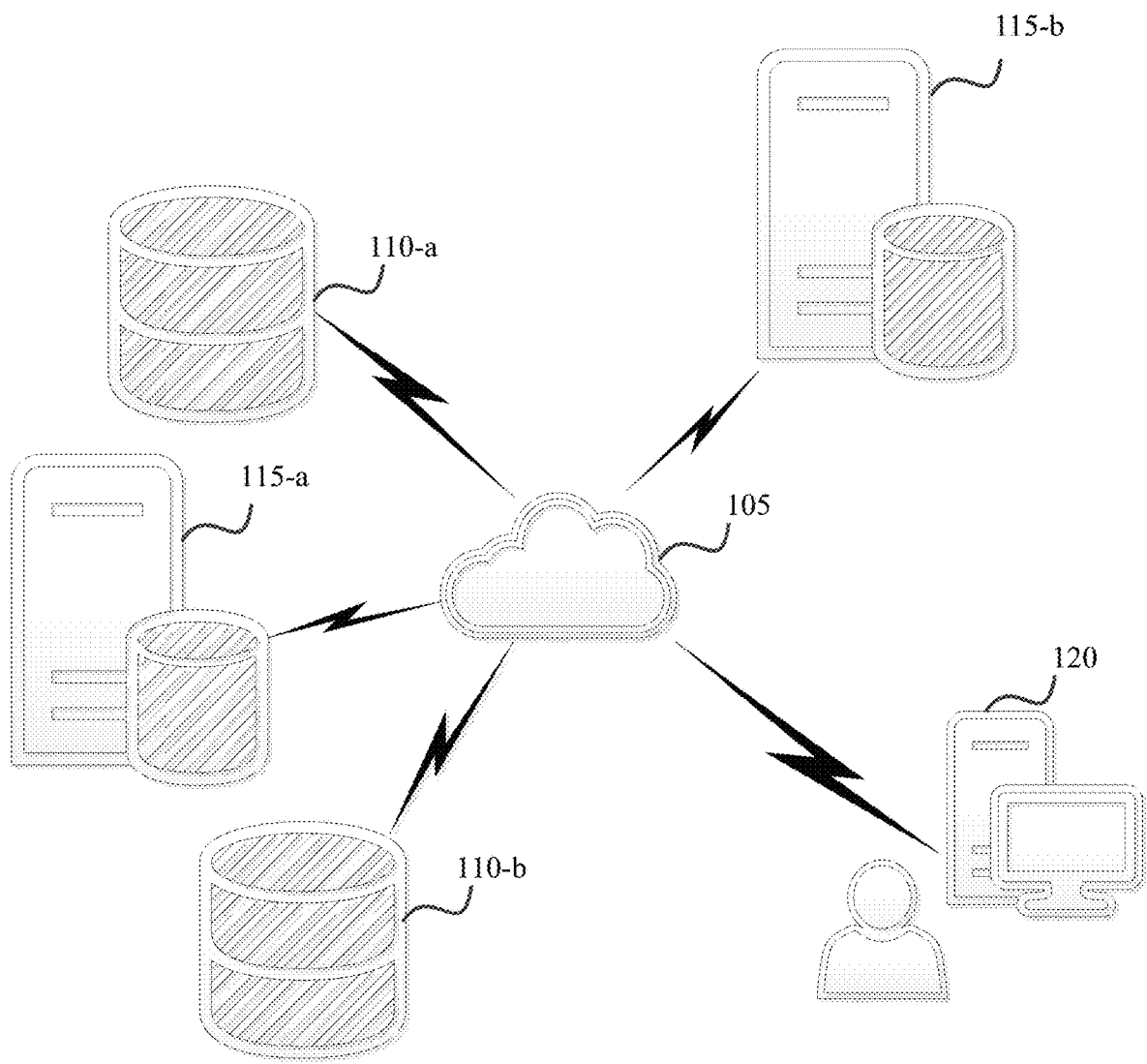
FIG. 1 depicts a system for adaptive recursive descent (ARD) according to an embodiment of the claimed invention.

The claimed invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly indicates otherwise).

As used in the specification and claims, the terms "fragments," "shards," "fragments or shards," and the like represent the outcome of splitting, dissolution, parting, crumbling, shattering or other means of dividing an individual data object or file into a plurality of pieces, including sufficient extra pieces to provide adequate resilience against loss of one or more of the plurality of pieces, that can thereafter be combined to recreate the individual data object or file.

Adaptive Recursive Descent (ARD)—this concept describes the process of utilising the well-understood model of recursion from Computer Science and extending it to permit a non-deterministic adaptive capability both in the recursive descent and the resolution through ascent. Traditionally, these stack-based approaches are deterministic, offering no potential for variation in the outcome as the resolution through ascent is fully determined by the fixed model of each function utilised in the descent. In ARD, the model of a function utilised in the descent can be varied in the ascent through policy variation, polymorphism, or parameterisation derived from contextual variations.

Quantum Fragmentation—this concept is not derived from the current models of Quantum Physics, but rooted in the original concepts of quanta, as variably defined values or amounts based on the rules or policies governing an action or transaction. In this context, quantum fragmentation describes a process by which the reduction of a datum into fragments can be variably and dynamically defined, in terms of the size or number of the fragments for each datum, or even within a single datum.

DETAILED DESCRIPTION OF THE INVENTION

Methods and systems described herein relate to adaptive recursive descent (ARD) data redundancy of electronic data.

An ARD system can fragment and distribute any data object or file, on an object by object or file by file basis, into a dynamic number of distributed fragments. A Quantum Fragmentation instance can receive data input and then cryptographically process, integrity check, and resiliently fragment the input data object or file.

One or more of those fragments (e.g., resilient, secured fragments) can then be either distributed into different storage locations across one or more Cloud networks or other data stores, such as on a IoT device, local server, mobile phone or laptop etc. This is accomplished through "stealth distribution" in line with a user-controllable and selectable dynamic policy applied to fragments on a data object or file-by-file basis.

One or more other fragments can also be passed to one or more of the same or other Quantum Fragmentation instances, at the next layer down, which can apply Quantum Fragmentation to the one or more other fragments from the previous layer and so forth.

Each ARD descent can include application by dynamic policies for the fragmentation and distribution of the fragments. In this way, any data object or file that is subject to ARD is not only Quantum Fragmented but is ultimately spread across different Cloud or other storage locations, thereby overcoming the problems of predictable storage targets for hackers. Further, each fragment can itself be repeatedly Quantum Fragmented in accordance with different policies for cryptographic processing, integrity checking, fragmentation, and resilience processing.

Also, fragments are de-identified via multiple stages of assigning unique identification keys that completely obfuscate the original data object or file name. This adds further anonymity to fragments, enhancing the privacy, security and protection of the original data object or file. The number and location of where fragments and fragments of fragments and fragments of fragments of fragments and so forth are stored are completely unpredictable to hackers.

ARD System

FIG. 1 illustrates a system for ARD quantum fragmenting data objects or files according to an embodiment of the claimed invention. The system can include a network 105, Quantum Fragmentation instances 110-a and 110-b, databases or other data stores 115-a and 115-b, and user devices 120. Databases include relational and non-relational or other database stores.

Data stores can include file, block and object stores, and network attached storage such as network attached storage (NAS) or storage area network (SAN), and in memory or cache stores, including data generated from in-memory applications, and other data stores.

The user device 120 can be any type of electronic device capable of connecting a user to the network 105. Examples include, but are not limited to, an enterprise or other server, a personal computer, a cell phone, a tablet, a laptop, and the like.

The user device 120 can access the network 105 to communicate with other entities of the system. In some cases, the network 105 is a secure network, and may require authentication and authorization by the user device 120 prior to granting access. The user device 120 can in some cases upload data objects or files to the network 105. In some cases, the data objects or files are previously locally stored (e.g., on the user 120). Alternatively, the data objects or files can be previously stored over the network 105, for example by a database, cache or other data store 115-a, 115-b, etc.

The Quantum Fragmentation instances 110-a and 110-b can fragment a data object or file of any type received individually or in data streams. For example, the Quantum Fragmentation instance 110-a can resiliently fragment a data object or file received into multiple fragments (e.g., FIG. 3 via a Secure Data Component 315). Integrity checking of the data object or file occurs before fragmentation to ensure the integrity of the data object or file received and after fragmentation to ensure the integrity of data fragments.

Figure 3:
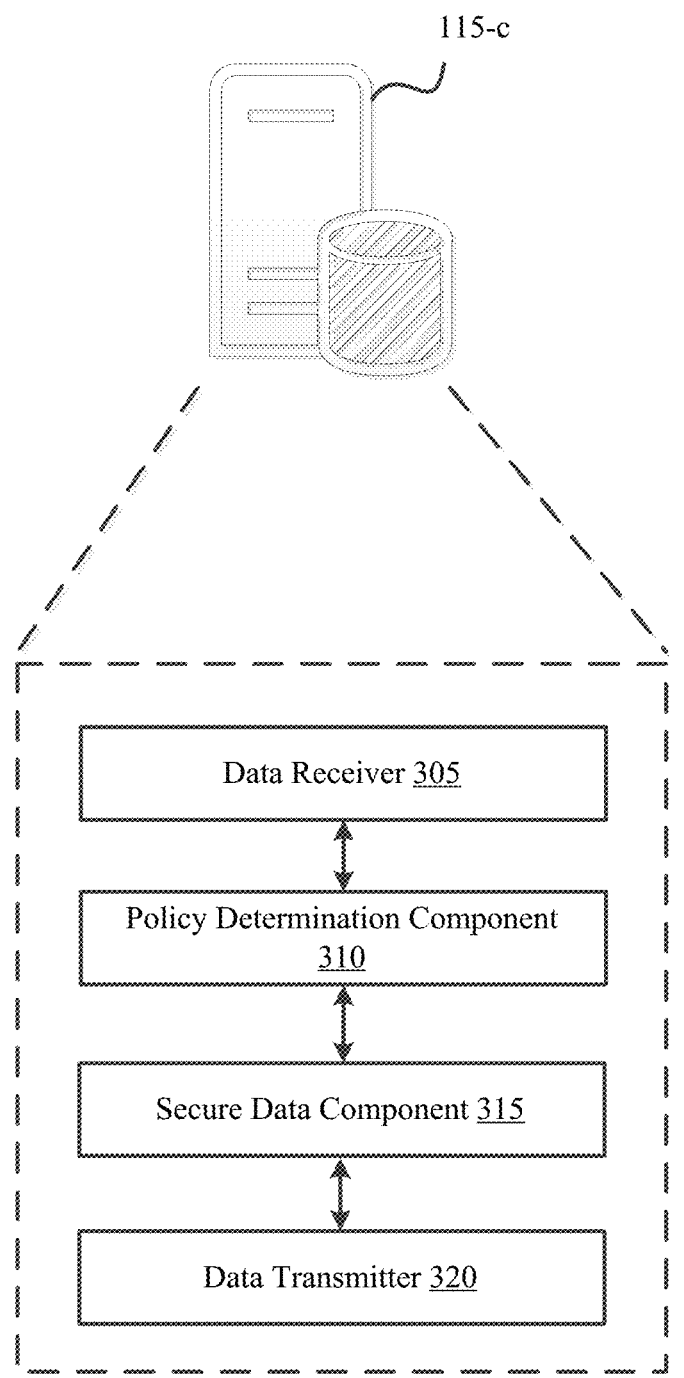
FIG. 3 depicts a Quantum Fragmentation instance for ARD according to an embodiment of the claimed invention.

Coterminous in FIG. 3, 315, the Quantum Fragmentation Instance 110-a cryptographically processes and integrity checks each fragment. The cryptographically processed, integrity checked, resilient fragments are then persisted via data transmitter (FIG. 3. 320) to other entities within the system, such as databases or data stores 115-a and 115-b and/or other Quantum Fragmentation instances 110-a and 110-b. For any data object or file fragmented by the Quantum Fragmentation instance, the policy determination component (FIG. 3, 310) ensures that no two fragments are persisted to the same database or data store 115-a and 115-b, etc.

Some of the fragments can be received by databases or data stores, such as databases or data stores 115-a and 115-b. The databases or data stores can subsequently store the fragments they receive. Examples of databases of the system can include, but are not limited to, relational databases, non-relational (NoSQL) databases, personal databases, centralized databases, object-oriented databases, graph databases, operational databases, end-user databases, commercial databases, cloud databases, distributed databases, and the like.

Examples of data stores of the system can include, but are not limited to, file stores, block stores or object stores.

One or more of the fragments can be received by the same or other Quantum Fragmentation instances in the system. In such cases, any fragment undergoing ARD processing at the next layer becomes the full data object or file for that layer, and experiences the same data integrity checks, improving data integrity across the ARD system of all data objects processed through the ARD system.

For example, the Quantum Fragmentation instance 110-b can receive a fragment from the Quantum Fragmentation instance 110-a. The Quantum Fragmentation instance 110-b can perform similar functions to the received fragment as the Quantum Fragmentation instance 110-a performed on the original data object or file. For example, the Quantum Fragmentation instance 110-b can perform a quantum fragmentation process on the fragment to generate fragments of the fragment. The Quantum Fragmentation instance 110-b can then persist the fragments of fragments via the data transmitter (FIG. 3., 320) to other entities within the system.

Further Quantum Fragmentation instances 110-a or 110-b can subsequently cryptographically process, integrity check, and resiliently fragment and persist one or more of the fragments of the fragments, thereby generating fragments of the fragments of the fragments of the of the original data object or file and so forth.

Figure 4:
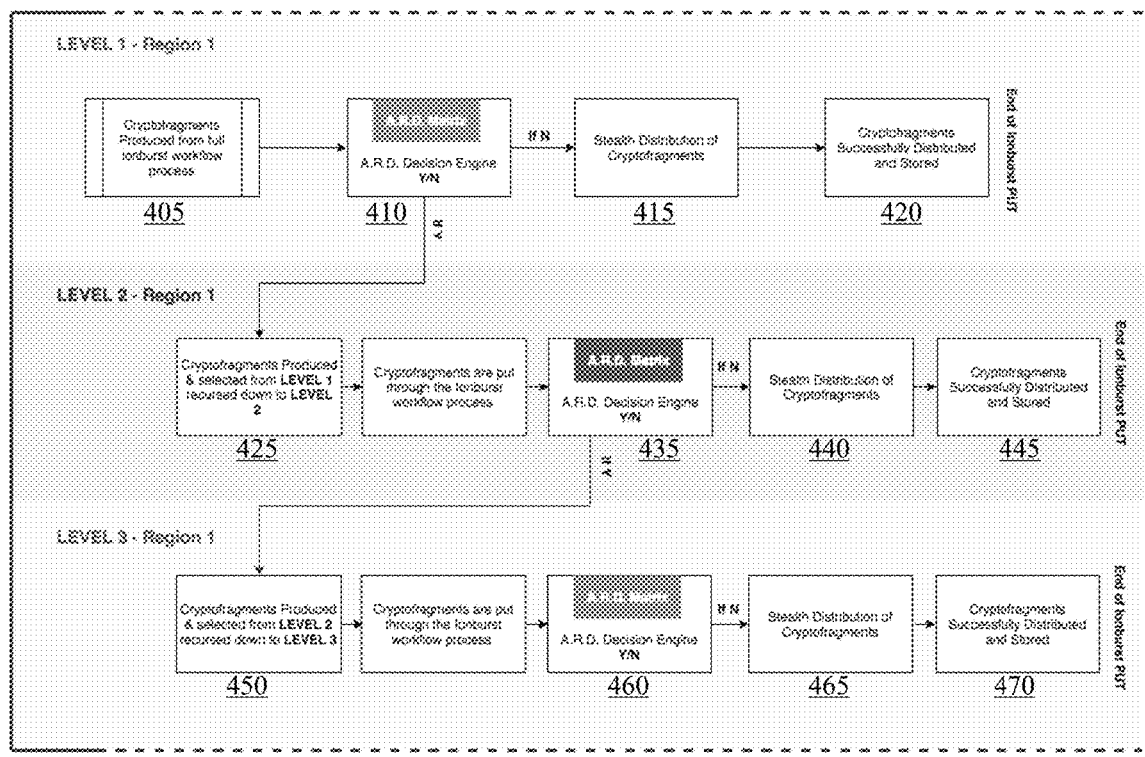
FIGS. 4-6 depict workflow processes for ARD according to embodiments of the claimed invention.

FIG. 4 provides for a single Cloud region-centric perspective of an ARD system, in accordance with embodiments of the claimed invention. The region-centric perspective may represent a geographically or virtually defined segment of a public, private, hybrid or other internetworking environment.

It should be noted that subsequent lower layers of the ARD system components remain unaware that ARD may take place on one or more fragments generated and persisted from preceding ARD layer Quantum Fragmentation on data objects or files. ARD system management processes actively manage setup, configuration, and administration of an ARD application on any data object or file based on end user selectable policy inputs such as levels of security and resilience, risk, location, latency, privacy or security classification, and system manager inputs that monitor parameters such as environmental factors, security, resilience, cost, latency, and so forth. ARD system monitoring is adaptive to environmental factor changes and parameter triggers, such as Cloud vendor or data store provider issues, Cloud or other data store latency, increased failure rates or exposure diagnostic events, or other security, exposure, or environmental parameters.

FIG. 4 depicts an ARD system that comprises a single Quantum Fragmentation "instance" operating in a single region. 3 levels of ARD are described in this example, although more or less levels of ARD may be involved.

A region is a distinct Cloud or other storage area, typically geographically bound such as US-East, US-West, US-Central, EU-West, Asia-Pacific, and may be known under different descriptions depending on the Cloud vendor or data storage provider. Cloud regions may be public, private, hybrid or other configured data stores accessible via an internet Application Program Interface (API) or other access method.

As shown, one or more fragments generated 405 by the Quantum Fragmentation instance may be filtered by the ARD Decision instance 410 to be persisted via stealth distribution policy 415 for processing by the data transmitter process (FIG. 3, 320) to one or more databases or data stores 115-a and 115-b, located in one or more Cloud or other storage locations 420.

Alternatively, one or more other fragments generated may be persisted via the ARD Decision instance 410 directly to the single Quantum Fragmentation instance "instance" at level 2 of the single region, and subsequently cryptographically processed, integrity checked and resiliently fragmented, thereby generating fragments 425 of the fragment of the original data object or file.

Consequently, further descents can occur adapted by the ARD Matrices 435, 460 and down further levels by persisting further fragments of fragments via one or more stealth distribution policies 440, 465 to Cloud or other data stores 445, 470 or to lower level Quantum Fragmentation instance instances e.g., 450 and so forth.

The ARD process may continue in accordance with end user and/or ARD system manager policy setting the appropriate level of data security, privacy and resilience for one or more data objects or files. No two fragments, or fragments of fragments, or fragments of fragments of fragments and so forth are stored in the same Cloud or other data store, to optimize security, privacy, and resilience at the data object, fragment, fragment of fragment and fragment of fragment of fragment etc., level.

Figure 5:
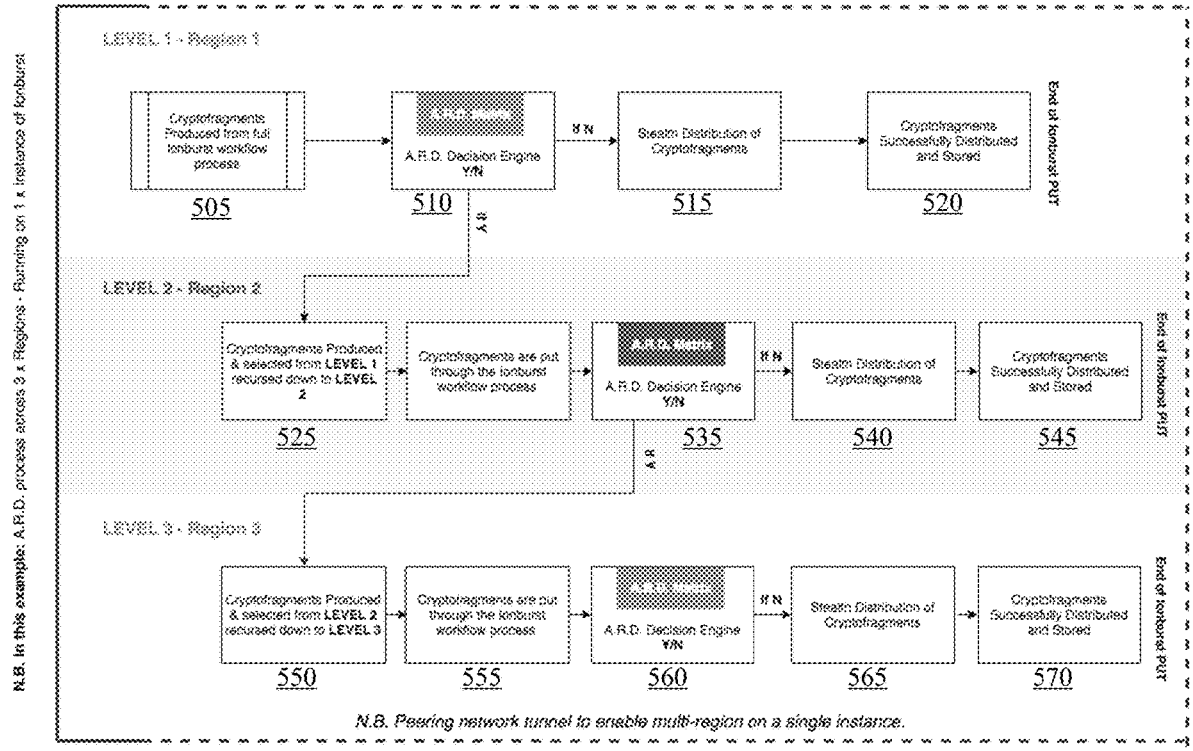

FIG. 5 illustrates a multi-region, single Quantum Fragmentation instance perspective of an ARD system, in accordance with embodiments of the claimed invention. In FIG. 5, an ARD system includes a single Quantum Fragmentation instance "instance" carried out over multiple regions. In this example, 3 regions are depicted, although more or less regions may be involved. Three levels of ARD are described in this example, although more or less levels of ARD may be involved.

A high availability, resilient, single instance of Quantum Fragmentation can communicate with the other corresponding entities in the different regions. For example, the caches of Region 2 can communicate with other caches of Regions 1 and 3. Regions are connected via peer network tunnels providing resilient virtual private connections in this example.

As shown, one or more fragments generated 505 by the Quantum Fragmentation instance in Region 1 may be filtered by the ARD Decision instance 510 to be persisted via stealth distribution policy 515 for processing by the data transmitter process (FIG. 3, 320) to one or more databases or data stores, located in one or more Cloud or other storage locations 520.

Additionally or alternatively, one or more other fragments generated may be persisted at level 2 via the ARD Decision instance 510 directly to the single Quantum Fragmentation "instance" of Region 2, and subsequently cryptographically processed, integrity checked and resiliently fragmented, thereby generating fragments 525 of the fragment of the original data object or file.

Consequently, further descents can occur adapted by the ARD Matrices 535, 560 and down further levels by persisting further fragments of fragments via one or more stealth distribution policies 540, 565 to Cloud or other data stores 545, 570 or to lower level quantum fragmentation e.g., 550 and so forth.

The ARD process can continue in accordance with an end user and/or ARD system policy setting the appropriate level of data security, privacy, and resilience for one or more data objects or files. No two fragments, or fragments of fragments, or fragments of fragments of fragments and so forth can be stored in the same Cloud or other data store, to optimize security, privacy, and resilience at the data object, fragment, fragment of fragment and fragment of fragment of fragment etc., level.

Another manifestation of the above multi-region, single instance ARD may be configured to persist fragments, fragments of fragments and so forth from one region to another. A fragment generated in Region 1 505 may be persisted via the ARD Decision instance 510 for Quantum Fragmentation in Region 3 550. The resulting fragment of that Quantum Fragmentation 555 may be persisted via ARD Decision instance 560 at Region 3 for Quantum Fragmentation in Region 2 525 and so forth.

The ARD process may continue in accordance with an end user and/or ARD system manager policy setting the appropriate level of data security, privacy and resilience for one or more data objects or files. In a multi-region ARD configuration, policies may be mutually exclusive in each region or coordinated. No two fragments, or fragments of fragments, or fragments of fragments of fragments and so forth can be stored in the same Cloud or other data store, to optimize security, privacy, and resilience at the data object, fragment, fragment of fragment and fragment of fragment of fragment etc. level.

Figure 6:
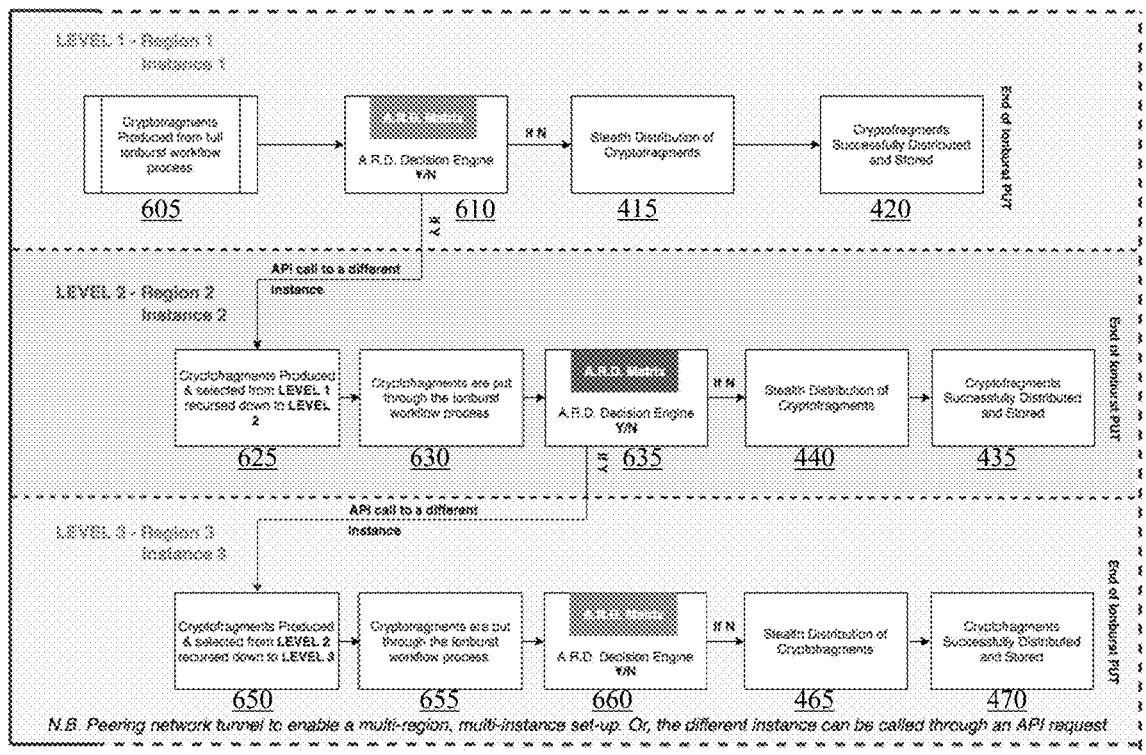

FIG. 6 depicts an ARD system with multiple Quantum Fragmentation instances running over multiple Regions, according to an embodiment of the claimed invention. As shown, the entities of the different regions have independent components but can communicate within their respective region and with other components in other regions for added resilience and failover. 3 levels of ARD are described in this example, although more or less levels of ARD may be involved.

In this example, the high availability resilient instances of Quantum Fragmentation instances across the 3 regions can communicate with other ARD system entities in the different regions. For example, the caches of region 1 can communicate with other caches of regions 1 and 3. Regions are connected via peer network tunnels providing resilient virtual private connections in this example. In addition, API connectivity between each ARD decision instance in each region 610, 635, 660 and the corresponding Quantum Fragmentation instances in each region 605, 625/630, 650/655 enable greater resilience, privacy, and security of fragments, fragments of fragments, fragments of fragments of fragments, and so forth.

The ARD process may continue in accordance with an end user and/or ARD system manager policy setting the appropriate level of data security, privacy and resilience for one or more data objects or files. In a multi-region, multi-Quantum Fragmentation instance ARD configuration, policies may be mutually exclusive in each region and for each Quantum Fragmentation instance or coordinated. No two fragments, or fragments of fragments, or fragments of fragments of fragments and so forth can be stored in the same Cloud or other data store, to optimize security, privacy, and resilience at the data object, fragment, fragment of fragment, fragment of fragment of fragment, etc. level.

Policy Determination Component

Each Quantum Fragmentation instance may be configured to operate according to policies for security, privacy, and resilience and other parameters such as geolocation, latency, role, department, organisation, group, party, and so forth. Policies may include ARD parameters to several levels in accordance with risk appetite, security, privacy, and resilience parameters and other parameters relevant to Quantum Fragmentation. Policies may be set by end users and/or by the system manager. The resulting policies determine the degree and manner of cryptographic processing, integrity checking, and resilient fragmenting, and the levels of ARD to be applied for each data object or file received. In some cases, policies may be specific to each Quantum Fragmentation instance. Additionally, or alternatively, policies can differ based on parameters such as the data object or file size, type, owner, source or destination location, latency or recovery priority, security, resilience, privacy or risk level or other parameter relevant to the data object or file received. The policy is equally relevant at each level of ARD and so applies equally to original data objects or files, fragments, fragments of fragments, fragments of fragments of fragments, and so forth.

In other cases, the policy can be wholly or partially randomized and made less predictable in accordance with system determined parameters. For example, policies may adapt in-flight due to the sudden unavailability of Cloud or other stores (FIG. 1, 115-*a* and 115-*b*), suspicious activity or anomalous latency detected for certain Cloud or other stores, cost of storage, end customer regulated policy changes, carbon impact or other environmental system impact.

Data Privacy and Resilience Methods

The system can employ various data privacy and resilience options for any received data object or file, fragment, fragment of fragment, fragment of fragment of fragment etc., repeatedly in accordance with the ARD policy component applied. The number of fragments, fragments of fragments, fragments of fragments of fragments etc., are determined by one or more policies applied at each ARD level.

Additionally, resilience against failover in the Cloud provides greater challenges for organizations. Multiple copies of data are often backed-up by organizations and third parties responsible for providing services such as Cloud storage. These multiple copies provide greater data exposure risk, beyond the traditional access and privacy controls of an organization.

The claimed invention overcomes this exposure by creating and persisting data fragments, fragments of fragments, fragments of fragments of fragments etc., across multiple mutually exclusive Cloud or other data stores, thereby providing additional security, resilience, and privacy at the data object level. The claimed invention also provides data resilience against multiple Cloud or other data store failures, at an individual data object or file level. The ARD system adds significantly increased data privacy and resilience by generating, persisting, and storing fragments and fragments of fragments etc., across multiple Cloud or other data stores in accordance with unpredictable policies applied at an individual data object or file, or fragment, or fragment of fragment etc., level. It does so at less carbon impact of storage than any typical backup or duplication schemes in use today.

Cryptographic & Integrity Checking Methods

The system may dynamically employ in accordance with policies applied one or more cryptographic techniques or schemes for securing data objects or files and corresponding data fragments. Similarly, the system does so for integrity checking of data objects or files, or data fragments at any level of ARD.

The particular one or more techniques or schemes employed may be dependent upon the specific policy scheme selected by an end user or applied by the system manager.

Cryptographic schemes that may be applied as components for data security include, but are not limited to, data encryption schemes, stream ciphers (e.g. ChaCha (IETF), HC (128/256), Panama, Rabbit (128/256)), AES and its candidates (e.g.RC6, MARS, Twofish, Serpent, CAST-256), other block ciphers (e.g. Blowfish, Triple-DES); and hashing schemes for data integrity (e.g. SHA-3, SHAKE 128/256).

De-Identification and Anonymization

All fragments at all ARD levels generated have Universally Unique Identifiers (UUIDs) (known also as Globally Unique Identifiers (GUIDs)), applied to obfuscate their identity from the originating data object or file. UUIDs are applied at several stages, including during persistence to one or more Cloud or other data stores. UUIDs are used to link each mutually exclusive and discrete step of the fragmentation and ARD processes.

In this way, the transmitting and receiving entity in the system can identify the relevant fragment according to its corresponding UUID, without compromising overall system integrity or security.

By persisting fragments, fragments of fragments, fragments of fragments of fragments etc., to one or more Cloud or other data stores, the ARD system abstracts the anonymization and de-identification of each data object or file, fragment, fragment of fragment etc., rendering original data objects or files completely obfuscated, anonymized and context-less. Fragments persisted at each ARD level are stored in different data stores to their corresponding fragments and are no longer recognizable as belonging to the original data owner or to the context of the original data object or file.

Quantum Fragmentation

The Quantum Fragmentation instances of the system are entities that include the necessary technology apparatus, networking, communications and security infrastructure (including whether physically, virtually or otherwise configured) and software for performing the functions described above. FIG. 3 illustrates a Quantum Fragmentation instance 110-*c* according to the embodiments of the claimed invention. Further, the Quantum Fragmentation instance 110-*c* can be an example of Quantum Fragmentation instance 110-*a* and/or 110-*b* described in FIG. 1. The Quantum Fragmentation instance 110-c can include a data receiver 305, a policy determination component 310, a secure data component 315, and a data transmitter 320.

The data receiver 305 can receive a data object or file, individually or as a stream of data. The data object or file can be received from a user device, such as user device 120 of FIG. 1, or alternatively be received from a database or data store, such as database or data store 115-a or 115-b of FIG. 1. The data receiver 305 can also receive a fragment (or fragment of fragment etc.) of a data object or file, for example when the Quantum Fragmentation instance 110-c is on a "lower level" of the ARD process. The data receiver can also receive metadata corresponding to the data file, for example a data object or file identifier (e.g., a UUID), party identifier, application token or other metadata related to access, ownership, data object or file attributes or other metadata.

The policy determination component 310 determines the policy corresponding to the received data object or file. In some cases, the policy determination component 310 selects a policy from a plurality of policies (e.g., from policies stored in memory, or related to a specific end user, party, system override or default, security, resilience or privacy level, location parameters or other parameters). Additionally, or alternatively, the policy determination component 310 determines a process to execute on the received data object or file, whether specified by an end user or the system manager or automated in accordance with a pre-specified policy. Further, the policy determination component 310 can identify and select entities (e.g., specific or geolocation defined databases or data stores and/or other Quantum Fragmentation instances) to which to transmit the resulting fragments.

The secure data component 315 can fragment the data file according to the policy. The secure data component 315 can execute any of the policy processes described above. The data transmitter 320 can transmit the fragments to various entities throughout the system. These entities can be selected according to the policy described above. Additionally, or alternatively, the entities can be selected based on maintaining active or secure or low latency or other parameter driven communications with the Quantum Fragmentation instance 110-c.

Adaptive Recursive Descent

Figure 2:
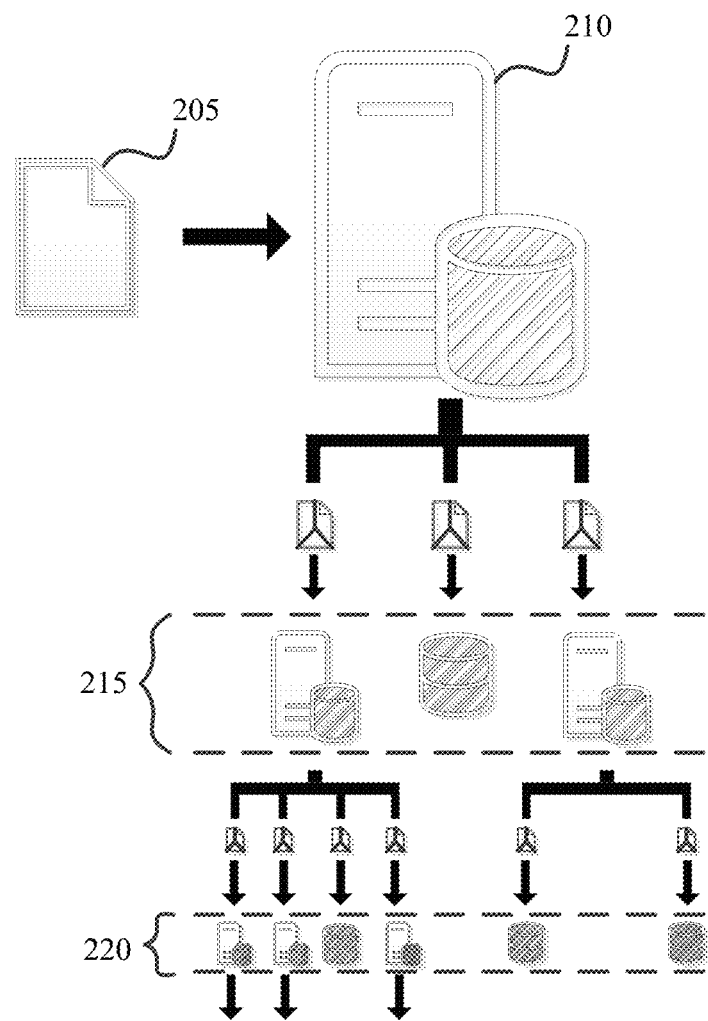
FIG. 2 depicts a workflow process for ARD according to an embodiment of the claimed invention.

FIG. 2 illustrates a process flow of ARD according to an embodiment of the claimed invention. FIG. 2 illustrates 3 "layers" of data process and storage. The Quantum Fragmentation instance 210 can be viewed as "layer 1," layer 2 215, and layer 3 220. Each layer can perform storage and/or Quantum Fragmentation processes described above.

For example, Quantum Fragmentation instance 210 (e.g., layer 1) can receive and fragment the data object or file 205 (e.g., according to the determined policy). The Quantum Fragmentation instance 210 can then persist one or more of the resulting fragments to the entities in layer 2 215, which, in this example, includes two Quantum Fragmentation instances, and associated databases and data caches. The Quantum Fragmentation instances of layer 215 can fragment the fragments they receive according to their determined policies, and subsequently persist the resulting fragments of fragments to the entities of layer 3 220. Layer 3 220 entities can perform similar processes. For example, the databases of layer 3 220 can store metadata related to fragments received and generated, whereas the Quantum Fragmentation instances of layer 3 220 can further fragment one or more of the fragments, and persist them to a subsequent layer for further fragmentation or for storage in Cloud or other data stores. This process can continue until all fragments at all layers are stored in Cloud or other data stores.

FIGS. 4-6 depict processes similar to that described with reference to FIG. 2. In particular, FIG. 4 depicts a process flow for ARD in a "one region" environment, where the fragmentation process undertaken occurs within a single Quantum Fragmentation instance. FIG. 5 depicts a process flow for ARD in a "multiple region" but single Quantum Fragmentation instance environment, where the process undertaken occurs across multiple regions for increased security and resilience, but fragmentation occurs using a single instance. FIG. 6 depicts a process flow for ARD across multiple regions utilising multiple Quantum Fragmentation instances, providing increased security, privacy and resilience.

Security

Following the process flow of FIG. 2, the systems and methods described herein provide multiple layers of secure, private and resilient data processing and storage. Each individual data object or file can be fragmented and passed through ARD layers multiple times. Thus, should a security breach occur at one of the databases or Quantum Fragmentation instances in the system, a hacker can potentially gain access to a single step or fragment, or fragment of fragment etc., of the original data file, without knowing how many layers down the ARD process the fragment was generated, how many layers back up one needs to go in order to retrieve the original data file, how many fragments are needed to reconstitute the original data object or file, and what the one or more policies are that were applied to the original data object or file, or fragment, or fragment of fragment etc.

Likewise, any fragment resisted provides no information as to those corresponding layers the original data object or file or fragments, or fragments of fragments experienced. Each fragment is anonymized, context-less and de-identified one or more times from the originating data object or file, ensuring the contents, ownership and location of the original data object or file are obfuscated, secure and private at all times.

Restoring Data Object or File

Figure 7:
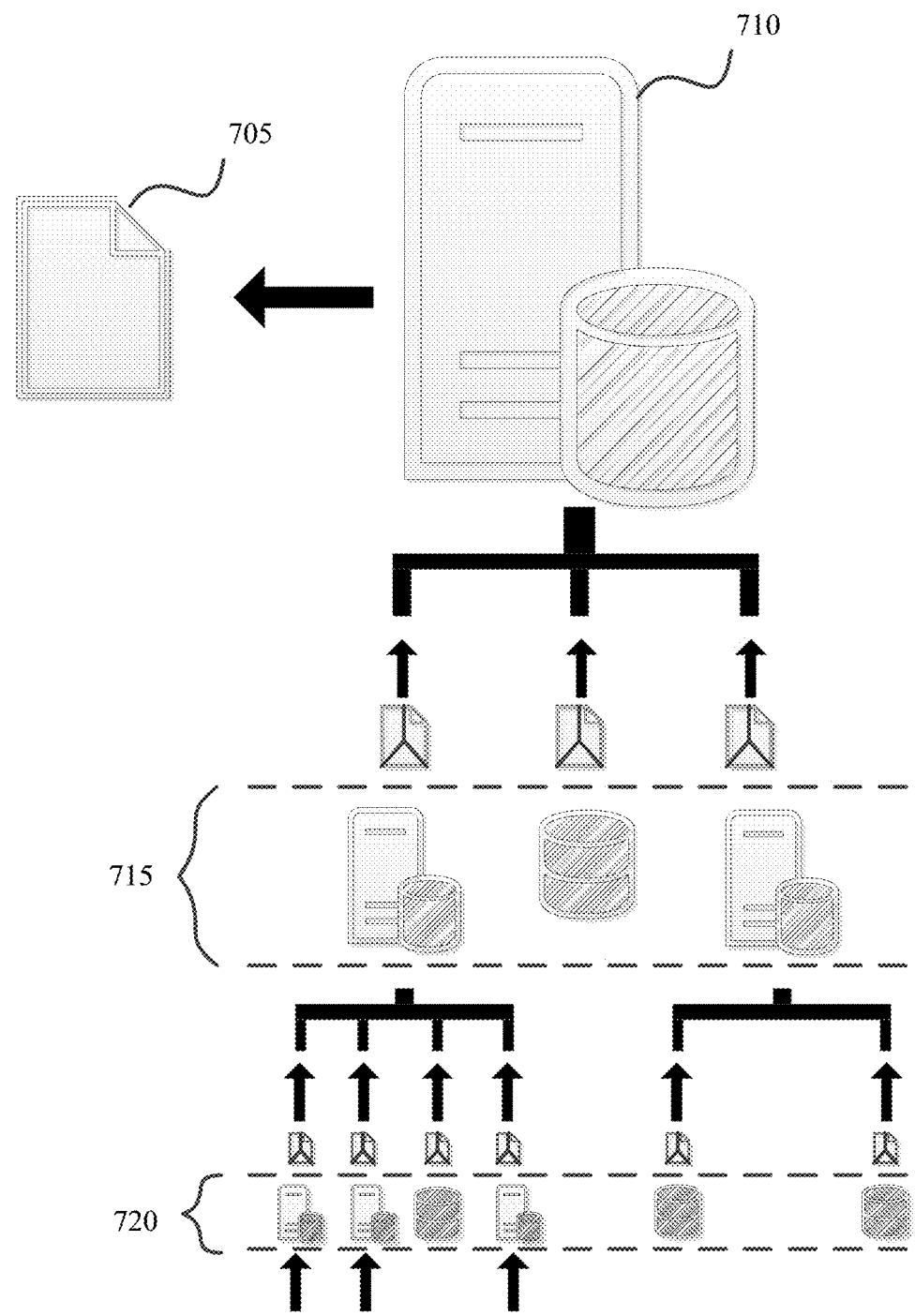
FIG. 7 depicts a workflow process for restoring a data file according to an embodiment of the claimed invention.

Restoring a data object or file occurs in reverse to the process flow discussed in FIG. 2 and is depicted in FIG. 7. For example, a restoration process can be initiated by a request or communication generated by a user device (e.g., user device 705). The Quantum Fragmentation instance 710 of the first layer receives a request for the original data object or file (e.g., via its UUID) from the restoration communication. Further, the first layer Quantum Fragmentation instance 710 can identify the applied policy for the data object or file, and subsequently identify the fragmentation process the data object or file underwent.

The persistence instance associated with the Quantum Fragmentation instance 710 of the first ARD layer identifies the entities which received fragments after first layer fragmentation 710 (e.g., Cloud or other data stores, databases and Quantum Fragmentation instances in layer 2 and so forth). Stored fragments are retrieved and passed to the Quantum Fragmentation instance 710 for restoration. Where fragments were persisted via lower ARD levels for further Quantum Fragmentation the process is repeated at the lower levels until the minimum number of fragments necessary for restoration are received.

The Quantum Fragmentation instances of Layer 2 715 perform a similar process with respect to Layer 1. For example, the persistence instance associated with the Quantum Fragmentation instance of layer 2 715 identifies relevant persisted fragments (e.g., from a fragment persisted by the first layer ARD process), determines a corresponding Quantum Fragmentation policy for the fragment, and identifies entities which received fragments of the fragment. The persistence instances associated with the Quantum Fragmentation instances of Layer 2 715 can then transmit restoration requests to these entities (e.g., of Layer 3, 720).

In response to restoration requests, the relevant persistence instance (e.g., via data transmitter 320 of FIG. 3) may request retrieval to the upper level of relevant fragments from entities of a lower layer that have been stored or previously received from an even lower level. For example, a persistence instance (e.g., via data transmitter 320 of FIG. 3) in Layer 3, 720, can request retrieval of fragments (e.g., via a UUID) previously persisted to one or more Cloud or other data stores and subsequently transmit them once restored at that Layer 3, 720 to the corresponding persistence instance related to the Quantum Fragmentation instance in Layer 2 715.

Likewise, Quantum Fragmentation instances in Layer 2 715 can reconstitute the reconstituted fragments (e.g., according to corresponding policy), and subsequently transmit the reconstituted fragments to the requesting persistence instance related to Layer 1 Quantum Fragmentation instance 710. This process can occur until the Quantum Fragmentation instance 710 receives a sufficient minimum number of fragments to reconstitute the original data object or file 705.

It should be noted that once the Quantum Fragmentation instance or instances in each ARD system layer have retrieved the minimum number of fragments necessary to reconstitute the data object or file or fragment etc., requested by the next higher ARD layer, the ARD system no longer needs to retrieve further fragments from Cloud or other data stores. This process enables faster recovery of data objects or files than originally persisted to Cloud or other data stores from the same originating data object or file, facilitating a more carbon efficient and compute efficient data recovery system. This adaptive policy driven process also enables granular degrees of security, resilience and privacy to be applied to any data object or file or fragment etc., at any ARD level.

For example, ARD Layer 3, 720 may recover a minimum M from a total of T fragments persisted via one Quantum Fragmentation instance and another minimum M from another total of T fragments from another Quantum Fragmentation instance to reconstitute 2 valid data objects or files to persist back to Layer 2, 715 as fragments. Layer 2, 715 may recover the 2 data objects or files or fragments recovered by ARD Layer 3, 720 in addition to one or more other fragments persisted directly to Cloud or other data stores at Layer 2, 715 up to a minimum level M from a total of T persisted depending on the resilience level selected or applied.

ARD Layer 2 715 may have mutually exclusive policy parameters applied to each Quantum Fragmentation instance involved in ARD processing from ARD Layer 3 720. This can result, for example, in a further minimum of M from a further total of T fragments being recovered by one or more Quantum Fragmentation instances at Layer 2 715, including fragments from one or more of the two ARD generated fragments at Layer 3 720, the remaining fragments making up the further minimum M being recovered from fragments persisted directly to Cloud or data stores at Layer 2 715.

The process continues until a minimum subset of M fragments from a total of T fragments are recovered by the ARD Layer 1 Quantum Fragmentation instance, 710 to reconstitute the original data object or file 705 received.

Data Resilience, Security and Privacy

The policy determination component (e.g., FIG. 3, 310) of each Quantum Fragmentation instance (e.g., FIG. 1,110-*a*, 110-*b*) determines amongst other factors the number of fragments to be generated and persisted for storage or ARD. It also determines the minimum number of fragments required to be retrieved to reconstitute the original data object or file received by the data receiver (e.g., FIG. 3, 305). The difference between the total number of fragments generated, persisted and stored, and the minimum number of fragments to be retrieved to reconstitute the original data object or file sets the level of resilience, or redundancy, and the level of security applied to the data object or file received. The privacy of the original data object or file is also improved, highlighting the present invention's unique ability to deliver privacy, security and resilience in combination at an atomic data object or file level across multi-Cloud or other data stores.

Finally, the policy determination component (e.g., FIG. 3, 310) can determine the persistence policy to be applied to data objects or files or (at subsequent ARD levels) fragments received etc., and whether they are to be stored in Cloud or other data stores or persisted to a lower ARD level Quantum Fragmentation instance. This process can be repeated in accordance with the current invention down one or more ARD levels dependent on the end user and system manager policies applied at each ARD level.

Thus, a data object or file can be restored from a subset of the overall number of data fragments generated at each ARD level. In some cases, policies can include a level of resilience or redundancy for fragmentation. In some cases, this level of resilience or redundancy can take into account issues pertaining to connectivity between entities of the system. For example, some entities may experience power failure at the time of receiving a restoration request, or experience latency issues, or be subject to hardware failure or data compromise. While those entities may not able to transmit corresponding data fragments, the data object or file requested at each ARD level can still be restored if each level Quantum Fragmentation instance receives a sufficient minimum number of fragments to restore the data object or file or fragment etc.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A computer-implemented method for quantum fragmenting a data object or file, comprising:
   identifying the data object or file for Quantum Fragmentation;
   determining, via a first portion of a Quantum Fragmentation computing entity, a factor of fragmentation for the data object or file;
   transforming the data object or file into a plurality of first data fragments according to the factor of fragmentation by applying one or more cryptographic processing, integrity checking, and resilient fragmentation schemes, via the first portion of the Quantum Fragmentation computing entity, wherein the transforming is variable and dynamically defined, in terms of the number of data fragments for each data object or file; and persisting, via the first portion of the Quantum Fragmentation computing entity, each of the plurality of first data fragments to a data store of a plurality of available Cloud or other data stores or to a subsequent portion of the Quantum Fragmentation computing entity, wherein the persistence for each of the first data fragment occurs independently from the other first data fragments.

2. The computer-implemented method of claim 1, wherein determining the factor of fragmentation further comprises determining a level of redundancy for the data object or file, wherein a minimum subset of the plurality of first data fragments comprises the full content of the data object or file, wherein the minimum subset is based on the level of redundancy.

3. The computer-implemented method of claim 2, wherein the number of first fragments persisted to a subsequent portion of the Quantum Fragmentation computing entity is at least equivalent to the plurality of first data fragments persisted, wherein the persistence of each first data fragment occurs independently from the other first data fragments.

4. The computer-implemented method of claim 1, wherein the first portion of the Quantum Fragmentation computing entity comprises a first set of processors executing a set of code, and wherein the subsequent portion of the Quantum Fragmentation computing entity comprises the same or a second set of processors different than the first set of processors and executing the set of code.

5. The computer-implemented method of claim 1, further comprising:
   determining, via the subsequent portion of the Quantum Fragmentation computing entity, a factor of fragmentation for a first data fragment;
   transforming the first data fragment into a plurality of second data fragments according to the factor of fragmentation by applying one or more of cryptographic processing, integrity checking, and resilient fragmentation schemes, via the same or a subsequent portion of a Quantum Fragmentation computing entity; and
   persisting, via the subsequent portion of the Quantum Fragmentation computing entity, each of the plurality of second data fragments to a data store of a plurality of available Cloud or other data stores or to another subsequent portion of the Quantum Fragmentation computing entity, wherein the persistence of each second data fragment occurs independently from the other second data fragments.

6. The computer-implemented method of claim 5, further comprising:
   determining, via the other subsequent portion of the Quantum Fragmentation computing entity, a factor of fragmentation for a second data fragment;
   applying one or more cryptographic processing, integrity checking and resilient fragmentation schemes, via the subsequent portion of a Quantum Fragmentation computing entity, the second data fragment into a plurality of third data fragments according to the factor of fragmentation; and
   persisting, via the subsequent portion of the Quantum Fragmentation computing entity, each of the plurality of third data fragments to a data store of a plurality of available Cloud or other data stores or to another subsequent portion of the Quantum Fragmentation computing entity, wherein the persistence of each third data fragment occurs independently from the other third data fragments.

7. The computer-implemented method of claim 1, further comprising:
   generating, via the first portion of the Quantum Fragmentation computing entity, an identification key for each of the plurality of first data fragments; and
   storing the identification keys at the first portion of the Quantum Fragmentation computing entity.

8. The computer-implemented method of claim 7, further comprising:
   receiving a request, via the first portion of the Quantum Fragmentation computing entity, for retrieving the plurality of first data fragments from a plurality of available Cloud or other data stores and portions of the Quantum Fragmentation computing entity that received first data fragments, wherein the request comprises at least the identification key;
   receiving at the first portion of the Quantum Fragmentation computing entity, at least one of the plurality of first data fragments from the plurality of Cloud or other data stores and portions of the Quantum Fragmentation instance computing entity; and
   generating the data object or file at the first portion of the Quantum Fragmentation computing entity from the at least one of the plurality of first data fragments.

9. The computer-implemented method of claim 8, wherein the at least one of the plurality of first data fragments comprises less than the plurality of first data fragments.

10. A non-transitory, computer-readable medium, comprising:
    one or more processors; and
    a set of instructions stored in memory that, when executed by the one or processors, cause the one or more processor to:
    identify a data object or file for Quantum Fragmentation;
    determine, via a first portion of a Quantum Fragmentation computing entity, a factor of fragmentation for the data object or file;
    transform the data object or file into a plurality of first data fragments according to the factor of fragmentation by applying one or more cryptographic processing, integrity checking, and resilient fragmentation schemes, via the first portion of the Quantum Fragmentation computing entity, wherein the transforming is variable and dynamically defined, in terms of the number of data fragments for each data object or file; and
    persist, via the first portion of the Quantum Fragmentation computing entity, each of the plurality of first data fragments to a data store of a plurality of available Cloud or other data stores or to a subsequent portion of the Quantum Fragmentation computing entity, wherein the persistence of each first data fragment occurs independently from the other first data fragments.

11. A system for quantum fragmenting a data object or file, comprising:
    a Quantum Fragmentation computing entity configured to:
    identify a data object or file for Quantum Fragmentation;

determine, via a first portion of the Quantum Fragmentation computing entity, a factor of fragmentation for the data object or file;

transform the data object or file into a plurality of first data fragments according to the factor of fragmentation by applying one or more cryptographic processing, integrity checking, and resilient fragmentation schemes, via the first portion of the Quantum Fragmentation computing entity, wherein the transforming is variable and dynamically defined, in terms of the number of data fragments for each data object or file; and persist, via the first portion of the Quantum Fragmentation computing entity, each of the plurality of first data fragments to a data store of a plurality of available Cloud or other data stores or to a subsequent portion of the Quantum Fragmentation computing entity, wherein the persistence of each first data fragment occurs independently from the other first data fragments.

* * * * *